Figure 1:
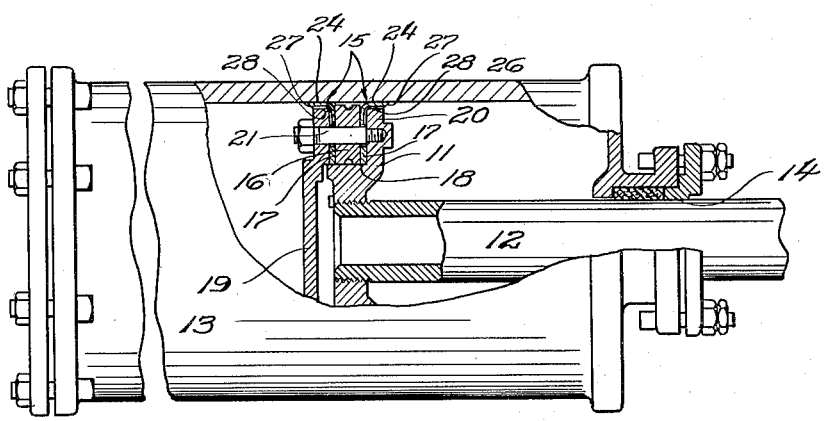

Sept. 5, 1950     F. W. BLAKE ET AL     2,521,145

REINFORCED PISTON CUP

Filed March 4, 1947

INVENTOR.
FRANK W. BLAKE
AND
BY JOE H. DUNLEVY
Fraser, Myers & Manley
their attorneys Patented Sept. 5, 1950

2,521,145

UNITED STATES PATENT OFFICE 2,521,145

REINFORCED PISTON CUP

Frank W. Blake, Chicago, Ill., and Joe Haskell Dunlevy, Palmyra, N. Y., assignors to The Garlock Packing Company, Palmyra, N. Y., a corporation of New York Application March 4, 1947, Serial No. 732,220

3 Claims. (Cl. 309—33)

This invention relates to reinforced piston cups, and more particularly to piston cups which are formed principally of material which, unless adequately strengthened, may become deformed or damaged after relatively short service on a piston.

It is conventional practice to mount about the periphery of a piston one or several piston cups which are substantially L-shaped in cross-section. Piston cups usually have a radial flange by which the cup may be clamped or otherwise secured to the piston, and also have a cylindrical flange which effects a wiping seal with the wall of the cylinder in which the piston works. Ordinarily, such piston cups have been made either of leather or of layers of fabric bonded together with a suitable bonding and sealing material. Such materials usually are relatively soft and pliant and possessed of a rather limited degree of resiliency. Also, in use, the material in such cups ordinarily becomes somewhat softer, more pliant and more easily distorted and somewhat less resilient.

Because of the pliancy or the reduced resiliency of the cup material the cylindrical flange of the cup in prior structures may not be held in engagement with the cylinder wall with sufficient firmness to prevent leakage of fluid pressure past the piston. Although split expanding rings have been used within the cylindrical flanges of piston cups to urge such flanges outwardly into firm sealing engagement with the cylinder wall, such expanding rings constitute a separate item of assembly and, in addition, have a tendency to localize their expansive force upon a very narrow annular area of the cylindrical flange, thus inducing wear of the flange at that area and yielding little or no enhanced sealing effect at other areas of the outer face of the sealing flange.

Because of the softness or pliancy of the piston cup material, the cylindrical flange of prior structures has a strong tendency to drag somewhat as the piston reciprocates within the cylinder; and this dragging occurs alternately in opposite directions as the piston moves back and forth. This rapidly weakens and ruptures the piston cup at the heel thereof, where the cylindrical sealing flange joins the radial mounting flange. Also, in the use of such prior piston cup structures, if the body of the piston is not quite precisely designed with reference to the cylinder within which it works, there might be a full, or at least a partial blow-back of the soft cylindrical flange under pressure. Such a substantially instantaneous breakdown of a piston cup might yield disastrous consequences in some types of machinery.

Also, a relatively soft, unsupported sealing flange according to prior structures, would not have any inherent capacity for withstanding the force of fluid pressure applied axially of the piston upon the free edge of said flange. Hence, except as somewhat ineffectually held between the piston and the cylinder wall, the soft sealing flange would tend to collapse axially with a shirring effect thus giving a non-uniform sealing effect over the outer face of the sealing flange and tending to cause that flange to wear out or become ruptured prematurely.

The object of the present invention, generally, is to remedy the mentioned shortcomings of prior piston cups. The objects, more specifically, are as follows:

An important object of the present invention is to provide a piston cup which will materially outwear those heretofore developed, yielding satisfactory service for longer periods of time and thereby requiring less frequent servicing jobs on piston assemblies.

Another important object is the provision of a piston cup of which substantially the entire outer area of the cylindrical sealing flange of the cup is positively urged into and held in firm sealing engagement with the inner surface of the cylinder in which the piston works.

Another important object of this invention is the provision of a piston cup in which the radial flange is reinforced to give it substantial rigidity whereby to prevent undesirable material outward cold flow of the said radial flange and otherwise to enhance the firmness of the mounting of the piston cup when the radial flange of the latter is clamped between clamping rings to secure the cup to the piston.

Another important object of the present invention is the provision of a piston cup which is substantially reinforced at the heel thereof whereby to prevent complete or partial blow-backs and to prevent material dragging of the cylindrical flange in operation which, if not prevented, would cause rapid breakdown at the heel of the piston cup.

Another important object is the provision of a piston cup having means for reinforcing the sealing flange against collapsing or shirring from the force of fluid pressure applied axially to the free edge of said flange.

Figure 2:
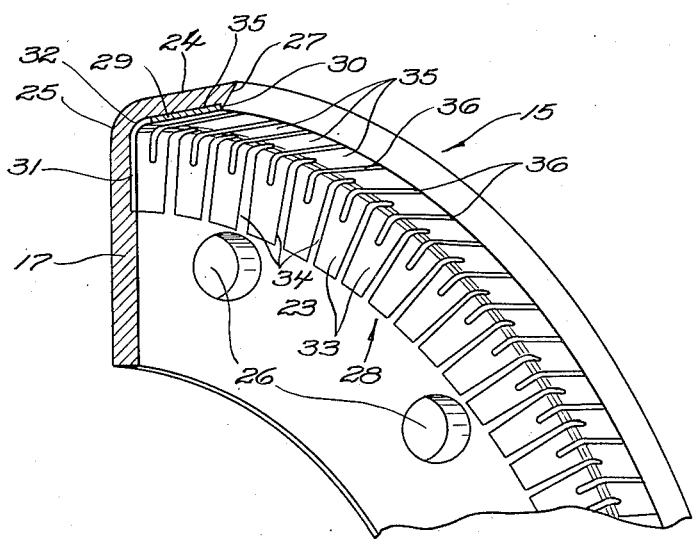

The foregoing and other objects and advantages which should be apparent from the following description, are accomplished by the present invention, of which, for illustrative purposes, a preferred embodiment is shown in the accompanying drawings. In these drawings:

Figure 1 is an elevational view of a cylinder, partly broken away, to show therein a piston having piston cups according to the present invention; and Fig. 2 is an enlarged fragmentary perspective view of a portion of a piston cup according to this invention showing both a radial sectional view of the piston cup and a view of the inner faces of the two flanges thereof.

Referring first to Fig. 1, a piston 11 suitably secured upon a piston rod 12 is mounted within a cylinder 13 for reciprocation therein in response to pressure which may be introduced alternately into opposite ends of said cylinder by suitable ports (not shown). The piston rod 12 extends through a gland 14 in one end of the cylinder, and the said rod, of course, may be connected to any mechanical structure which is to be actuated. Such a cylinder and piston arrangement is useful, for example, as a part of the reversing apparatus of a steam engine or locomotive, the rod 12 being suitably linked to the reversing gear of the engine or locomotive. In this arrangement the fluid introduced into the cylinder 13 to actuate the piston and thus operate the reversing gear may be either compressed air or steam.

In a piston arrangement of the character disclosed herein in which fluid pressure is applied alternately to opposite sides of the piston to move the latter back and forth, it is common practice to provide two piston cups arranged with their cylindrical flanges extending away from each other, and in the drawing two piston cups 15, according to the present invention, are shown with an annular distance piece 16 disposed between radial flanges 17 of the piston cups. These flanges and the distance piece 16 are firmly clamped, within an annular recess 18, between a clamping plate 19 and a radial flange 20 of the piston by bolts or studs and nuts 21 (only one being shown in the drawing). The bolt or stud extends through registering apertures in the clamping plate 19, the radial flanges 17 of the two piston cups and the distance piece 16, and the inner end of the bolt or stud is threaded into the radial flange 20 of the piston.

Fig. 2 illustrates the details of an improved piston cup 15 according to the present invention. From said figure it may be seen that a piston cup 15 has a body portion 23 consisting of the radial flange 17 and, integrally connected to the latter and extending from the outer margin thereof, a cylindrical sealing flange 24, the portion interconnecting these two flanges being hereinafter referred to as a heel 25.

The body portion 23 may be of any suitable relatively soft and pliant material such as, for example, cured rubber or synthetic rubber-like material, all being sometimes referred to hereinafter for convenience merely as "rubber". If reinforcing means according to the present invention are employed, there is no need for incorporating any fabric or fibrous material in the body portion 23. However, if desired, the said body portion, within the present invention, may have such fabric or fibrous material therein for giving it added body, but such fabric or fibrous material would not materially prevent distortion and damage to the piston cup as caused by the mentioned cold flow of the radial flange of the cup or by the mentioned dragging or shir- ring of the cylindrical flange. A plurality of holes 26 are provided in the radial flange 17 to receive the clamping bolts or studs 21. It is common practice, also, to bevel the free edge of the cylindrical sealing flange 24 as at 27.

In the form illustrated and described herein, a piston cup according to the present invention includes an annular supporting element 28, which is preferably formed of flat metal which is relatively stiff and somewhat flexible and is L-shaped in cross-section. This supporting element, preferably, is firmly embedded in the inner sides of both flanges of the piston cup and in the heel 25 thereof. The supporting element 28 thus has a cylindrical flange 29 preferably embedded in the inner face of the sealing flange 24 of the piston cup but preferably extending not quite to the bevel 27 so that the molded material of the flange 24 preferably extends about the free edge of the flange 29 of the metallic element, as at 30. The metallic element 28 also has a radial flange 31 which is preferably embedded in the inner face of the radial flange 17 of the piston cup and extends from the inner part of the heel 25 of said cup inwardly to a point adjacent the bolt holes 26. The metallic element 28 also has a heel 32 which preferably is embedded or bonded in or sets snugly and firmly within the heel 25 of the piston cup. Although such embedding of the heel 32 is desirable it is not essential provided that the engagement of the respective flanges of the element 28 and of the piston cup is sufficiently secure that the element 28, through its engagement with the flanges of the piston cup body 23, may serve to support the heel 25 as well as other parts of the piston cup.

It has been found advantageous to provide a metallic supporting element 28 which is substantially as shown in Fig. 2, comprising a plurality of radially-extending fingers 33 defined or separated by slots 34 which preferably extend through the heel portion 32 and partially into the cylindrical flange 29, so that the fingers 33 may be said to be L-shaped in cross-section. Likewise, it has been found advantageous to provide that the cylindrical flange 29 of the supporting element 28 comprises a series of axially-extending fingers 35 defined or separated by slots 36. These slots preferably extend from the free edges of the fingers 35 through the heel 32 and partially into the flange 31 so that it may be said that the fingers 35 are L-shaped in cross-section. By providing for the mentioned slots to extend through the heel 32, the fingers are correspondingly elongated and a substantial bendable portion of each finger is provided extending over areas at both sides of said heel; thus instead of the bend being localized, it is distributed over a substantial area, thus minimizing the possibility of breakage at the bend. It will be understood, of course, that the metallic element 28 comprises a series of fingers 33 and 35 extending in the form of a continuous ring about the inner sides of the flanges 24 and 17 of the piston cup and also around the inner side of the heel 25 of said cup. The element 28 may be made economically from strip material, serrated, cut into suitable lengths and the lengths suitably brought together to give said element the form of a ring.

By extending the open slots 34 and 36 through the heel 32 of the supporting element 28, both flanges and the heel portion of the latter may actually be embedded in the material forming the body portion 23 of the piston cup. By means of said supporting element, the piston cup may be held substantially rigid despite any inherent softness of the material of the body portion 23 of the piston cup or any further softening thereof which might occur in use.

The metal or other material of which the supporting element 28 is formed preferably is stiff enough to overcome any tendency toward harmful repetitious deformation of the piston cup at the heel 25 resulting from the mentioned dragging effect as the piston moves back and forth in the cylinder. Inasmuch as the supporting element 28, and more particularly the fingers of said element, are securely embedded in the flanges of the piston cup, the latter's cylindrical flange 24, instead of dragging, will be positively carried along by the piston through the medium of the supporting element 28. Thus, harmful deformation of the piston cup at the heel 25, is effectively prevented. Also, because of the direct or indirect support given to the heel 25 and the flange 24 of the piston cup by the supporting element 28, any possibility of blow-back or of distortion or shirring of the flange 24 from the force of fluid pressure introduced into the cylinder 13 is prevented. For these reasons a piston cup according to the present invention will retain an adequate sealing effect and, in general, last much longer than piston cups heretofore developed, thereby avoiding frequent replacements and the attendant expenses thereof.

It will be observed that the fingers 33 preferably, but not necessarily, extend almost to the outer portions of the holes 26. Thus, these fingers enter between any clamping rings or the like which may be employed to clamp the piston cup to the piston so that, despite the relative softness of the body portion 23 of the piston cup, any material degree of cold flow of the material of the radial flange 17 is prevented, thereby preventing any undesired distortion at the heel 25 and assuring that the effectiveness of the clamping of the piston cup to the piston will not be impaired.

The metal or other material of which the supporting element 28 is formed, preferably is resilient and normally (i. e., when not assembled in a cylinder) of a shape in which the re-entrant angle of the supporting element 28 is somewhat greater than 90°; so that the said supporting element, in addition to functioning as a supporting means for preventing harmful distortion and eventual early breakdown of the piston cup, also functions as a finger spring which is effective at substantially all portions of the sealing flange 24 of the piston cup to urge substantially the entire area of the outer face of the latter firmly into sealing engagement with the cylinder wall.

Obviously other variations than those specifically suggested herein could be employed while nevertheless conforming to the inventive concept as set forth in the accompanying claims.

What we claim is:

1. A piston cup comprising a body of relatively soft material and a supporting element; the said body having a substantially cylindrical sealing wall, a radially extending mounting wall, and an annular heel portion joining the two said walls, and the said supporting element comprising a circular substantially continuous strip of flat spring metal having a continuous intermediate circumferential bend defining circumferential flanges along opposite marginal portions of the strip and transverse, alternately located serrations in each of said flanges extending from the edge of the flange, inwardly across said flange and bend and substantially into the other flange whereby to provide spaced resilient fingers in each of said flanges of substantially greater length than the width of the flange and of enhanced resiliency over a substantial area at opposite sides of said bend and of decreased localization of bending and breaking tendency at said area; the said supporting element being associated with said body with one of its flanges fixed to one wall of the body and the other of its flanges fixed to the other wall of the body.

2. A piston cup comprising a generally cup-shaped body of relatively flexible molded material and an annular supporting element of flat resilient metal; the said body having a substantially cylindrical sealing wall, an annular mounting wall integral with said sealing wall and extending substantially radially inwardly therefrom, and an annular heel portion joining the two said walls, and the material of said mounting wall being subject to a tendency to flow radially outwardly in use of the cup and thereby to cause excessive wear of the body at the said heel; and the said supporting element comprising a plurality of axially extending spring fingers embedded at their free ends in said sealing wall and coacting therewith to urge said sealing wall radially outwardly, and a continuous circumferential series of radially-inwardly extending fingers having their free ends embedded in the material of the mounting wall portion at a circular line substantially outwardly of the inner periphery of the said mounting wall, thereby constituting a circular abutment which is substantially uniformly effective at all circumferential points for opposing outward flow of the body material.

3. A piston cup according to claim 2, further characterized in that the radial fingers define intervening slits into which the molded body material extends and engages the side edges of the radial fingers; the said side edges thereby aiding the free ends of the radial fingers in opposing outward flow of the body material.

FRANK W. BLAKE.
JOE HASKELL DUNLEVY.

REFERENCES CITED

The following references are of record in the file of this patent:

UNITED STATES PATENTS

| Number | Name | Date |
| --- | --- | --- |
| 1,769,984 | Bockius | July 8, 1930 |

FOREIGN PATENTS

| Number | Country | Date |
| --- | --- | --- |
| 427,988 | Great Britain | May 3, 1935 |